United States Patent [19]

Emerson, Sr.

[11] 4,437,894
[45] Mar. 20, 1984

[54] SIZING COMPOSITIONS CONTAINING A FORMIC ACID SALT, PROCESSES, AND PAPER SIZED WIH THE COMPOSITIONS

[75] Inventor: Ralph W. Emerson, Sr., Boston, Mass.

[73] Assignee: The Plasmine Corporation, Portland, Me.

[21] Appl. No.: 442,319

[22] Filed: Nov. 17, 1982

[51] Int. Cl.³ ............................................. C08L 93/04
[52] U.S. Cl. .................... 106/238; 106/218; 106/219; 162/180; 200/102
[58] Field of Search ............... 106/218, 236, 219, 238; 162/180, 159; 260/102

[56] References Cited

U.S. PATENT DOCUMENTS 4,025,354  5/1977  Emerson et al. .................... 106/218

Primary Examiner—Theodore Morris
Attorney, Agent, or Firm—Bernard, Rothwell & Brown

[57] ABSTRACT

Novel sizing comprising an aqueous mixture of ammonia, an ammonium salt of formic acid, and a rosin that is modified with from about 5 to 50 percent, based on the weight of the rosin, of an organic acidic compound selected from the group consisting of an $\alpha,\beta$-unsaturated organic acid, an anhydride thereof, and their mixtures. In one embodiment, the ammonia and ammonium salt are produced as the reaction product of urea and formic acid. A method of making the sizing compositions and paper which is sized with the sizing compositions are also provided.

39 Claims, 1 Drawing Figure

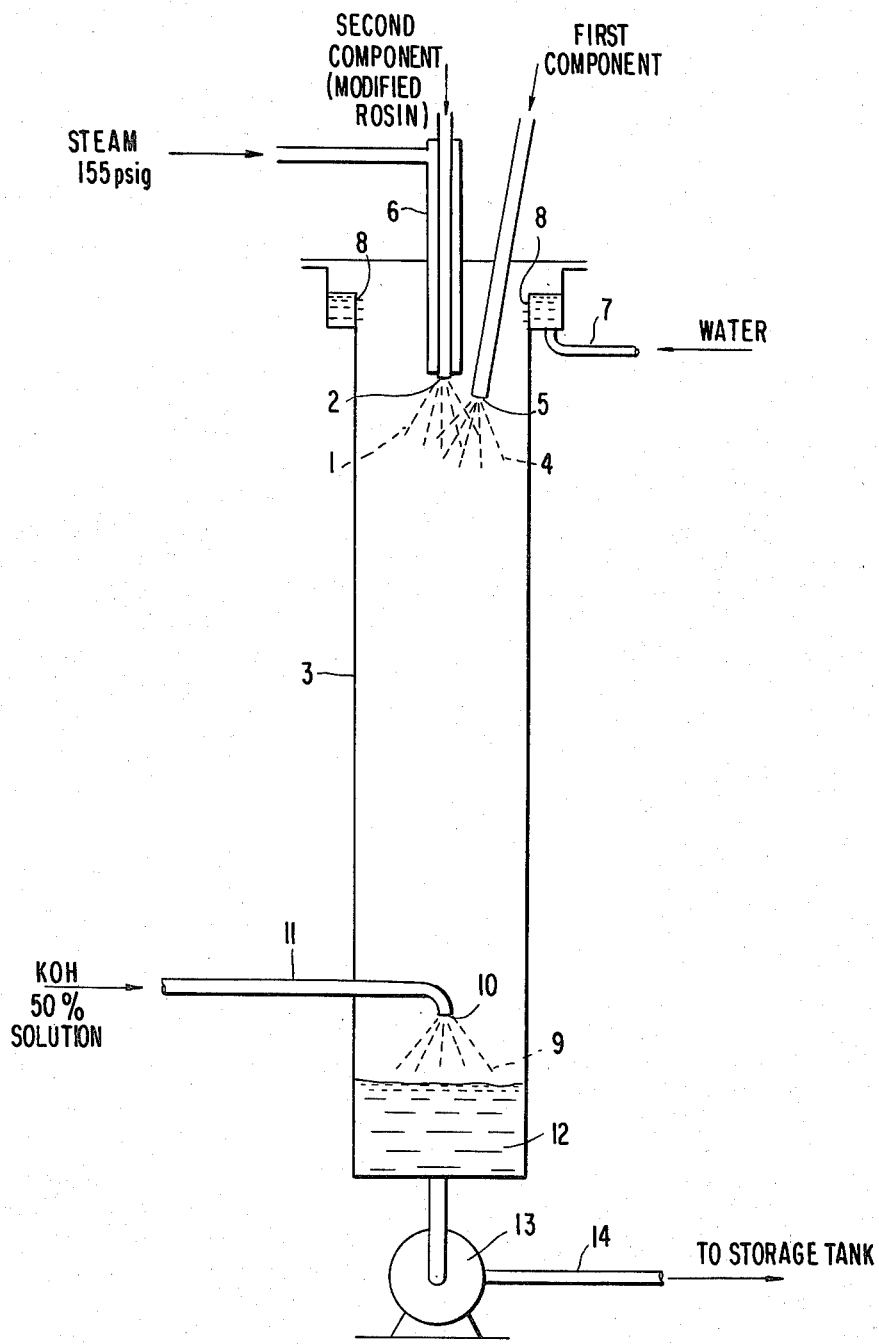

SIZING COMPOSITIONS CONTAINING A FORMIC ACID SALT, PROCESSES, AND PAPER SIZED WIH THE COMPOSITIONS

This invention relates to novel sizing compositions containing ammonia, an ammonium salt and modified rosin, to methods for making the compositions, and to paper products sized with the compositions.

Cellulosic products—paper, rigid paper, paperboard, molded products, and the like—are produced by applying a dilute suspension or solution of fibers in an aqueous medium onto a fine mesh screen through which the aqueous medium drains, leaving a thin mat of fibers. The mat is removed from the screen, further liquid is expressed and the sheet is dried to form the desired product. The fibrous raw materials used in this process are generally one or more of the several types of commercially available pulp. These pulps include mechanical pulps, or groundwoods, bleached or unbleached, and chemical pulps, for example bleached, unbleached, and semi-bleached sulfate and sulfite pulps, as well as semi-chemical pulps. Other fibrous constituents used as the fibrous paper and paperboard-making raw materials include reclaimed waste papers, cotton fibers, inorganic and synthetic organic fibers, and mixtures of these materials.

The first step in paper product manufacture is pulp stock preparation. Pulps are most conveniently handled in the form of slurry to facilitate their mechanical treatment non-fibrous additive mixing, and their delivery to the paper machine. Pulps are fed to the paper mill in a slurry directly from the pulping operation where both the pulping and paper-making are performed at the same location; otherwise they are received as dry sheets or laps, and must be slushed before use. Slushing separates the fibers and disperses them in the aqueous medium with minimum detrimental mechanical effect so as to produce a consistently uniform starting material. The pulp slush or slurry is subjected to mechanical action known as beating or refining before being formed into a paper sheet. During refining, the fibers are swollen, cut, macerated, and frayed controllably to produce smaller fibrillar elements and to thereby desirably affect the physical properties of the resulting end product. Unbeaten pulp produces a light, fluffy, weak paper, whereas well-beaten pulp yields stronger, denser paper. During the beating or refining process, many non-fibrous materials are added to the pulp solution. Among these are mineral pigments for filling and loading, such as kaolin, titanium dioxide, calcium carbonate, and other well known filling materials coloring additives and dyes, sizing agents, and other known beater additives.

After the pulp slurry has been beaten and refined and the additives mixed into it, this pulp slurry or furnish is delivered to continuous sheet forming equipment, such as a cylinder machine or a Fourdrinier, where it is discharged onto fine mesh screen through which the liquid carrier or aqueous medium drains and on which a fibrous mat is formed. The fibrous mat or sheet contains for example, about 80% water when it leaves the screening and is therefore passed through one or more rotary presses for more water removal. The pressed sheet is subsequently passed through a drying system such as steam-heated rotating cylinders to yield the finished product. Molded pulp products are made on different equipment by a similar process designed to form, dry and press individual molded items such as paper plates and the like.

Sizing agents, as mentioned, are added to the paper-making process pulp slurry so as to render the finished product resistant to liquid penetration. In the alternative, the sizing agents may be excluded from the pulp additives, and may be applied to the paper after it is dried with very effective penetration resistance. In this method, the dry sheet is passed through a size solution or over a roll wetted with a size solution. Such sheets are tub-sized or surface-sized.

Among the materials currently used as sizing agents are rosin, various hydrocarbon and natural waxes, starches, glues, casein, asphalt emulsions, synthetic resins, and cellulose derivatives. Rosin is one of the most widely used and most effective sizing agents. Extracted rosin is often partially saponified with caustic soda, and processed to yield a thick paste of 70 to 80% solids of which up to 30 to 40% is free unsaponified rosin. Dry rosin and completely saponified rosin are also used as sizing agents. Any of these rosins may further be modified, for example, by the addition of maleic anhydride or other supplements. At the paper mill, the rosin paste is dissolved or emulsified by diluting it to about 15% solids with hot water and then further diluting it with cold water under vigorous agitation to 5% solids or less. This solution or emulsion is either used for surface sizing or is added to the stock, for example 0.1 or 0.5 to 4.0% size based on dry fiber, usually before, but sometimes simultaneously with, for example, one to three times as much aluminum sulfate (papermakers alum). The aluminum sulfate is believed to form an ionically charged precipitant with the rosin size which is attracted to oppositely charged fiber.

Furthermore, sizing compositions have been disclosed which contain a specially modified rosin, ammonia and an ammonium salt. These compositions have been shown to be more effective than the well-known rosin types and are compatible with presently-used pulp, stock material, and additives. Such sizing compositions comprise an aqueous mixture of ammonia, an ammonium salt, and a rosin that is modified with from about 5 to 50, preferably from about 10 to 20 or 30 percent based on the weight of the rosin of an organic acidic compound selected from the group consisting of an $\alpha,\beta$-unsaturated organic acid an anhydride thereof, and their mixtures. The acids used in forming the ammonia and ammonium salt include sulfamic acid, phosphoric acid, oxalic acid, methane-sulfonic acid, tricholoro-acetic acid, nitric acid, sulfuric acid, hydrochloric acid, stearic acid and acetic acid. For example, acid can be used to react with urea to produce the ammonia and ammonium salt used in the sizing agents. Such sizing compositions are discussed in detail in U.S. Pat. No. 4,022,634 incorporated herein by reference.

It now has been discovered that surprising results are obtained when formic acid is employed as the acid in forming the ammonia and ammonium salt.

Generally, in the embodiment of the sizing compositions of the present invention wherein the urea-acid reaction product is used to provide ammonia and ammonium salt, the product is prepared in a multi-step method in which a first component reaction product is formed by reacting urea and the acid, a second component soap is formed by modifying rosin with an organic acidic compound, which component is saponified either before, during, or after modification, and a final product, the sizing composition is formed by mixing the two components.

In forming the first component reaction product, the urea and formic acid are mixed together and reacted. Water is preferably included in the mixture of urea and formic acid and is advantageously included in amounts by weight equal to the urea plus acid, although urea may be reacted with acid using water in excess of equal parts, or with little water. Thus, the first component reaction product may be formed by reacting urea with formic acid generally in the presence of from about 0 to about 90, preferably from about 40 to 60, wt. percent water, based on the total weight of the urea formic acid and water.

The urea is generally reacted with the formic acid at a temperature sufficient to cause a change in the pH of the mixture from an acidic pH to a basic pH, for instance, as determined by a pH meter. This temperature will generally range from about 212° F. to about 425° F., and is dependent upon the water content of the mixture to some extent and may generally be higher for mixtures containing a low water content. The temperature may also vary to some extent, depending upon the rate of reaction desired. Generally, the mixture boils at the temperature which changes the pH, and heating should preferably be maintained at boiling temperatures until boiling subsides, and preferably stops to maintain a pH greater than about 7 in the resulting mixture. For example, a 50 percent water/50 percent urea-formic acid first component mixture, when maintained at a temperature of about 215° F. to about 230° F., will increase in pH to above 7.

Although the pH change is an important indication that the urea-formic acid reaction is complete, a more important consideration is the total acidity of the first component reaction product. This total acidity is measured as the amount of sodium hydroxide, expressed as the equivalent parts by weight of calcium carbonate, required to impart a pink color to a million parts of a phenolphthalein-containing, 50 weight percent, aqueous solution of the reaction product, and may be determined by use of the Hach Chemical Company Total Acidity Test (Hach Chemical Co., Ames Iowa, Model AC-5 Acidity Test Kit). When the formic acid is reacted with the urea, ammonia and an ammonium salt are produced. This reaction raises the pH and affects the total acidity of the mixture. Although it is not fully understood, this higher acidity (higher than pure urea) is believed to be a factor in providing the ultimate superior sizing composition obtained. Thus the amount of formic acid to urea is an important aspect, and is best defined in terms of the resulting total acidity which it creates. The desired minimum total acidity is at least about 1,000 parts per million, and is preferably at least about 4,000 ppm. The actual amount of formic acid reacted with the urea is generally at least about 0.1 percent, e.g., from about 2 to 7 percent, and preferably from about 4 to about 5 percent, based on the weight of the urea, although more may be used, e.g., over 7 percent acid based on the weight of the urea, to achieve the desired results. However, in using amounts over 7 percent, the effectiveness appears to diminish without any advantage. It has been found that a mixture containing 5 percent formic acid, based on the weight of the urea, produces a reaction product having a total acidity in excess of 1000 ppm, and a pH of between 7 and 9, when reacted in a 50 percent water, 50 percent urea-sulfamic acid mixture. (The total acidity is difficult to determine when it exceeds about 75,000 ppm or so, and for this reason, the total acidity of this particular reaction product was merely determined as being in excess of 1000 ppm.) By way of comparison, the reaction product of 0.25 percent formic acid with urea has a total acidity of 1000 ppm.

Reaction of the urea with the formic acid is preferably, but not necessarily, conducted out of the presence of the rosin and organic acidic compound. If desired, however the urea can be reacted with the acid while in admixture with the modified rosin, as more fully discussed hereinafter.

Optionally, amounts of ammonia, generally up to about 7 percent by weight of the total mixture of ammonia, water and formic acid reaction product, may be added to the mixture of the reaction product and water after it has cooled to room temperature. This enhances the sizing results achieved upon combination with the specially modified rosin. For example 20 parts of 29% aqueous ammonia are mixed at room temperature with 80 parts of the mixture of the urea-acid reaction product and water. This mixture is then combined with the modified rosin, as more fully discussed hereinafter.

The proportion of the urea-acid reaction product to produce ammonium formate may vary from about 100 to 1 to about 1 to 4. The amount of formic acid present in the boiling mixture is at least about 0.1 and preferably 4 to 5 percent based on the weight of the ammonium formate and the urea-acid reaction product.

In another embodiment, the ammonium salt is combined with urea and formic acid to provide the ammonia and ammonium salt components of the sizing agent of the present invention. Thus, for example, dry powders of ammonium formate and urea and formic acid are dissolved in water and urea and formic acid are reacted by heating to about 220° F. at which temperature the mixture goes from an acid pH to an alkaline pH of about 8. The proportion of the urea to the ammonium salt generally may range from about 2 to 1 to about 1 to 4, and preferably is about 1 to 4. The amount of the acid is generally at least about 0.1 percent, and preferably from about 0.2 to about 8.0 percent, based on the weight of the urea, although more may be used, e.g., 15 or 20 percent acid based on the weight of the urea can be used. This reaction product first component may then be combined with modified rosin in place of the urea-formic acid reaction product to yield a sizing agent.

As noted above, the ammonium salt component of the sizing agent of the present invention is ammonium formate. Solid ammonium formate may be used or, alternatively, the salt may be developed by reacting an aqueous solution of the formic acid with ammonia.

In forming the second component of the sizing compositions, the modified rosin, rosin is modified with an alpha, beta-unsaturated organic acid e.g., an alpha, beta-unsaturated aliphatic acid generally containing from about 3 to 10 preferably from about 3 to 6 carbon atoms, or its anhydride, and mixtures thereof. Preferred modifiers include maleic acid, maleic anhydride acrylic acid and fumaric acid.

Rosin is a mixture of resin acids (including abietic, pimaric, and levopimaric acids), hydrocarbons and high molecular weight alcohols, and is obtained from any of three sources. Gum rosin is the residue remaining after distillation of turpentine oil from crude turpentine oleoresin obtained from living pine trees. Wood rosin is the residue remaining after distilling off volatile fractions of the solvent extraction product (usually using naphtha as the solvent) from pine stumps. Tall oil rosin is a by-product in the fractionation of tall oil, an oily mixture of rosin acids, fatty acids and neutral materials obtained from the acid treatment of spent black liquor from paper and pulping processes. All three types are very similar chemically, except that tall oil rosin often contains 1 to 5% fatty acids after fractionation, whereas gum rosin and wood rosin do not. As mentioned above, rosin may be used in sizing agents in "dry" form, or it may be partially or completely saponified. In the sizing compositions of the present invention, gum rosin, wood rosin, tall oil rosin, or their mixtures, may be used. Tall oil rosin is preferred, however, as it generally produces the best results, possibly due to the presence of the fatty acids therein.

As mentioned, the organic acidic compounds which may be used in modifying the rosin are alpha beta-unsaturated organic acids, anhydrides and their mixtures. Amounts of the organic acidic compounds used to achieve the desired results generally range from about 5 to 50 percent or more, based on the weight of rosin, but preferably from about 9 to 30 percent is used, particularly about 15 percent. The modified rosin is formed into a soap by known methods, for example, by the addition of sodium hydroxide or potassium hydroxide. The rosin may be saponified before, during or after it is modified. Saponification need not be complete, but should preferably suffice to render the final sizing composition water-soluble. With respect to embodiments of the present invention comprising the reaction product of ammonia and modified rosin, ammonia is preferably used as one of the saponifying bases.

To form the second component of the sizing composition, the rosin may be first melted, e.g., in a jacketed kettle, which is preferably covered and agitated to speed up the melting process. When the rosin is in hot liquid form, advantageously an alkylene amine, e.g., triethylenetetramine, is added in size-enhancing amounts, generally from about 5 to 20, preferably from about 8 to 12, pounds per 6000 pounds of rosin. The organic acidic compound, in an amount as described above, may then be stirred in gradually as the rosin continues to be heated at about 325° to 420° F. When the organic acidic compound is added, a reaction occurs which raises the temperature of the mixture. It is preferred that the rosin be melted before addition of the organic acidic compound in order to make certain that the materials are reacted uniformly. The temperature is then held at a point above 212° F., and may go as high as about 550° F., although temperatures of from 385° to 420° F. are preferred, for at least about 30 minutes, preferably from about 4 hours to about 7 hours to complete the modification of the rosin. This produces a dark brown clear, syrupy mixture which will solidify if permitted to cool. After the rosin has been modified, the hot mixture may be poured into an aqueous solution of a saponifying base, e.g., sodium hydroxide, potassium hydroxide, or mixtures thereof, under slow agitation to saponify the rosin if it has not already been saponified or is only partially saponified. The solution of saponifying base may advantageously contain from about 5 to 35 percent of the base, based on the weight of the water. In a preferred method of making the sizing compositions of this invention, a sufficient aqueous solution of saponifying base is used to produce an aqueous mixture of modified rosin soap containing from about 50 to 70 weight percent solids, which mixture is preferably allowed to cool, and can be subsequently mixed with the ammonia and ammonium salt compound or with components which produce them. Alternatively however the saponifying base may be added to the rosin before it is modified, or even during modification to effect saponification.

While the formation of this second component has been described in terms of reacting an anhydrous mixture of molten rosin and the organic acidic compound, the second component may alternatively be formed by first mixing rosin with water and then adding the sizing agent of this invention, the second component may be formed in the presence of from 0 to about 60 percent, preferably from 0 to about 10 percent water based on the total weight of the rosin, the organic acidic compound and the water.

In mixing the reacted urea-formic acid first component with the modified rosin soap second component to form an embodiment of the novel sizing compositions, sizing-effective amounts of the components are used. Such amounts range, generally from about 25 to 85 percent of the first component and from about 75 to 15 percent of the second component, based on the total dry weight of the sizing composition. Such sizing compositions generally have a water content of at least about 25 percent, often about 40 to about 60 percent.

This embodiment of the sizing compositions can be formed by simply mixing the first component and the second component at room temperature. Less advantageously, the components may be mixed and heated to the boiling point of the mixture to assure that all reactions are completed.

When the first component and the second component are combined at an elevated temperature, the modified rosin may be heated to or kept at a temperature at which the combination may be carried out. This combining may comprise adding a diluted mixture of the first component reaction product, which is heated, to the heated second component, in order to effect chemical and physical mixing. The mixture of first and second components can be heated at about 212° F. to boil off the water, and is preferably kept at the boiling-off temperature until the cloudy solution becomes substantially clear. Optionally, after component combination is completed, very small amounts of ammonium, sodium or potassium hydroxide, or their mixtures, may be employed to adjust the pH of the product back into the basic range. These amounts of the hydroxide, up to about 20 percent by weight of the mixture, will generally raise the pH to the desired range. The selection of first component and second component dilution concentrations prior to component mixing is dependent on the desired relative amounts of first component and second component and on the desired concentration of the resulting sizing compositions. The choice of combination temperatures employed is a function of workability and of the desired degree of chemical and physical mixing. In one embodiment of the process, temperatures of at least about 80° F. may prevent precipitation on mixing.

In accordance with a particularly preferred embodiment of the present invention, the first and second composition components as described hereinbefore are combined while the second component, and preferably also the first component, are in a finely-divided liquid or solid state or are finely-divided mixtures of liquids and solids. The second component and optionally the first component may be particulated in particulating amounts, e.g., finely divided into particles which may be solid or liquid, e.g., droplets, by various means that will be apparent to those skilled in the art to intimately mix the components together before saponification to provide an enhanced sizing composition. Advantageously the average diameter of such liquid or solid particles ranges from about 10 to 1000 microns, preferably from about 20 to 250 microns.

It has been found that conversion of the second component into fine particles can be accomplished by adding the liquid or solid second component to the first component while the first component in liquid form is subjected to high shear agitation in a blender or mixing apparatus. Addition of the second component to the agitated first component liquid serves to finely divide the second component as it contacts the agitated liquid. The blender or mixing apparatus agitating element can be operated at a speed that provides shear agitation which is sufficient to finely divide the second component being added into particles having an average diameter within the 10 to 1000 micron range. A Waring blender operating with a mixing element speed of from about 10,000 to 25,000 r.p.m. can, for example, be used to agitate the first component as the second component is combined therewith.

Alternatively, when the two components are in the liquid form, both components can be forced through spray nozzles and the two streams of spray combined in a suitable container. In this manner both the first and second components are divided into droplets within the aerosol size range. Advantageously, the nozzles employed produce droplets having an average size of from about 10 to 200 microns, preferably from about 20 to 125 microns. As an example of nozzles which can be used successfully, the second component can be sprayed from nozzle No. 49487650 manufactured by Spray Engineering Company, East Split Brook Road, Nashua, N.H., 03060, while the first component is sent through a similar full cone center jet nozzle also manufactured by Spray Engineering Co. Steam under pressure is a suitable gas for forcing the second component through such a nozzle. The first component spray can be formed with or without using a pressurized driving gas. Streams from the two nozzles can then be combined to effect component mixing while both components are in a finely-divided state.

When using the agitation embodiment, the second component, and optionally the first component, are finely-divided according to the process into fine liquid or solid particles, the components can simply be mixed at room temperature and upon mixing, the temperature of the mixture rises and the components react. Less advantageously, these components may be mixed and heated to the boiling point of the mixture to assure that all reactions are completed.

As mentioned above, ammonia, the ammonium salt, and the specially-modified rosin or a soap of the specially-modified rosin may be combined at room temperature to yield a sizing agent. The soap of the specially-modified rosin can be prepared by pouring the hot mixture of the rosin and the rosin-modifying organic acidic material into an aqueous solution of a saponifying base e.g , sodium hydroxide potassium hydroxide, or mixtures thereof, under slow agitation to saponify the modified rosin. Sufficient aqueous solution of the saponifying base can be used to produce an aqueous mixture of modified rosin soap containing from about 50 to 70 weight percent solids. Based on the total weight of the ammonia, the ammonium formate, and the rosin and the modifying organic acidic material on a dry basis, the sizing agent may have from about 3 percent to about 30 percent ammonia, from about 4 percent to about 72 percent ammonium salt and from about 93 to about 25 percent rosin plus modifying organic acidic material, using a ratio of ammonium salt to ammonia that is greater than about 1:1. The term "dry" is used throughout this specification to mean exclusive of any water which is present. The ammonia may be produced in situ by reaction between the rosin, the modifying organic acidic material, and the ammonium salt by using from about 4 percent to about 75 percent rosin plus modifying organic acidic material based on the total weight of the ammonium formate and the rosin and modifying organic acidic material on a dry basis.

The amount of ammonia used depends upon whether or not ammonia is the sole saponifying agent used. When ammonia alone is used to saponify the specially-modified rosin, about 10 percent to about 75 percent ammonia, and from about 25 percent to about 90 percent rosin plus modifying organic acidic material based on the total weight of the ammonia and the rosin plus modifying organic acidic material on a dry basis, can generally be used to prepare the sizing agent. When ammonia is reacted with a soap of the specially-modified rosin, the mixture can generally be prepared with from about 4 percent to about 60 percent ammonia, and from about 96 percent to about 40 percent rosin plus modifying organic acidic material, based on the weight of the ammonia and the rosin plus modifying organic acidic material on a dry basis.

Procedures involved in the preparation of the sizing compositions herein, other than the use of formic acid in the first component in accordance with the present invention, are set forth in the specifications of U.S. Pat. Nos. 4,022,634 and 4,141,750, U.S. and application Ser. No. 377,398, filed May 12, 1982, a continuation of U.S. application Ser. No. 165,988, filed July 7, 1980, (now abandoned), which was a continuation of U.S. application Ser. No. 020,480, filed March 14, 1981, (now abandoned) all of which are incorporated herein by reference.

These improved sizing compositions exhibit superior sizing properties compared to the prior art sizing agents when used in the same amount, and equivalent properties can be obtained when used in lesser amounts, than the prior art sizing agents, thus enabling the user to meet existing standards with less sizing agent than heretofore required, and, therefore, at a lower cost.

The products resulting from the use of the sizing compositions of this invention can be brighter and stronger than those produced with the heretofore available sizing agents. The novel sizing compositions also assist in the drying of the sheet when employed as a pulp additive so that the paper-forming machine may be speeded up to produce a sheet of the same moisture content. Alternatively, more water may be added to the pulp stock to give the fiber on the paper machine wire a better orientation, thereby producing a stronger paper with superior formation. The novel sizing compositions are normally employed alone as a sizing agent with papermaker's alum in pulp stock or in surface sizing, but may be combined with various sizing agents to replace a substantial part of those known agents.

The improved sizing composition may be employed as a pulp additive or as a surface sizing agent in the manufacture of cellulosive products. The exact amount to be used to produce optimum results may vary, depending upon the type of pulp used and the desired properties of the finished product. Amounts generally less than those currently used with known sizing agents may generally be used to produce substantially equivalent or superior products. Thus, for example, while known rosin sizing agents are generally used in amounts from about 0.1 or 0.5 percent of fibers of the pulp slurry, the sizing compositions of this invention may be used in amounts as low as about 0.02 percent or 10 percent or more. Thus, from about 0.02 to 2% up to about 10 percent of the sizing compositions herein, by dry weight based on the weight of fibers in the pulp slurry, may be used. Typically, where 1 percent of known rosin sizing agent is normally used, 0.7 to 1.2 percent of the novel agent of this invention can be used to obtain substantially equivalent or superior results.

Preparation of the sizing compositions in the manner specified herein also permits formulation of less costly compositions. This can be accomplished since less of the relatively more costly components such as the modified rosin needs to be utilized to prepare compositions of sizing effectiveness substantially equivalent to the prior art compositions which contain greater amounts of the more expensive components.

The compositions and methods of this invention are further illustrated in the following examples.

EXAMPLE I

Sulfamic Acid Containing Sizing Made By Agitation Method

The first component of a sizing agent is prepared by placing 1,000 grams of commercially available urea, 50 grams of sulfamic acid, and 1,050 grams of water in a cooking vessel and subsequently applying heat while slowly agitating the contents until the reaction mixture boils at atmospheric pressure. When the temperature reaches about 103° C., boiling stops, water loss ceases, and the pH of the solution, as determined by a pH meter, rises to about 8. The resulting first solution is a clear solution having a total acidity of 86,000 ppm, as determined with the Hach Chemical Company's Acidity Test Kit Model AC-5.

To form the modified rosin component, 3000 grams of commercially available tall oil rosin is melted in a cooking vessel. To the molten rosin is added slowly with agitation 360 grams of fumaric acid. The reaction mixture is then heated with continuous agitation to about 205° C. and held at this temperature for 2 to 10 hours.

To form the sizing agent, 240 grams of the first component and 200 grams of water are placed in a high speed blender; e.g., a Waring blender. The second component (200 grams), either molten or in the form of solid particles, is added to the contents of the blender and agitated for a period of about 30 seconds. The addition of the second component in this manner insures that the second component is finely divided as it contacts the agitated first component.

Ninety grams of potassium hydroxide in the form of a 50 percent by weight water solution then is added and blended for about 30 seconds. The pH of the solution is then adjusted with sodium hydroxide to a value in the range of 9.0 to about 10.0, and sufficient water is added to bring the total solids content of the solution to about 50 percent by weight.

The first neutralization can be accomplished with sodium hydroxide, but if this is done, the second neutralization should be performed with potassium hydroxide.

EXAMPLE II

Formic Acid-Containing Sizing Of The Present Invention Made By Agitation Method

The first component of a sizing agent is prepared by placing 1,000 grams of commercially available urea, 50 grams of formic acid, and 1,050 grams of water in a cooking vessel, and subsequently applying heat while slowly agitating the contents until the reaction mixture boils at atmospheric pressure. When the temperature reaches about 103° C., boiling stops, water losses cease, and the pH of the solution, as determined by a pH meter, rises to about 8. The resulting first component product is a clear solution having a total acidity of 86000 ppm, as determined with the Hach Chemical Company's acidity Test Kit Model AC-5.

The second component and the sizing agent are prepared according to the procedure of Example I.

EXAMPLE III

Ammonium Sulfamate Containing Sizing Made by Agitation Method

The first component of a sizing agent is prepared by mixing 1,050 grams of water, 50 grams of commercially available ammonium sulfamate, and 1,000 grams of commercially available urea at room temperature until the ammonium sulfate and urea are completely dissolved.

The resulting solution is clear and has a total acidity of 84000 ppm, as determined with the Hatch Chemical Company Test Kit Model AC-5.

The second component and the sizing agent are prepared according to the process of Example I.

EXAMPLE IV

Ammonium Formate Containing Sizing Of The Present Invention Made by Agitation Method The sizing agent is prepared according to the procedure of Example III except that the first component is prepared with 50 grams of ammonium formate in place of 50 grams of ammonium sulfamate.

EXAMPLE V

Sulfamic Acid Containing Sizing Made By Spray Method

In an apparatus such as that illustrated in the drawing, the second component prepared as in Example I in the amount of 1,000 parts is forced into a spray 1 by forcing it through an adjustable cone pattern nozzle 2 (e.g., Nozzle No. 49487650 manufactured by Spray Engineering Co., East Split Brook Road, Nashua, N.H. 03060). Spray 1 is injected into a tube 3 where it meets a spray 4 of first component, also prepared as in Example I, issuing from a full cone center jet nozzle 5. The temperature of the second component is at about 182° C. and the nozzle 2 through which it passes is heated by a shroud 6 filled with steam at about 155 psig and at a temperature of about 182° C. The amount of first component is 2,000 parts of a 50 percent by weight solids product. Water from duct 7 in the amount of 1,000 parts, less the amount of steam coming from the openings in the shroud 6 around the nozzle 2 for the second component, is introduced into the apparatus through openings 8 to wash down the walls of the tube 3 and prevent build-up of solids. The reaction product meets a spray 9 of 50 percent by weight potassium hydroxide solution containing from 200 to 400 grams of potassium hydroxide introduced into the tube 3 through opening 10 in duct 11. The resulting solution 12 then is pumped to a storage tank not shown by a pump 13 through duct 14 where the pH value is adjusted to from 9.0 to about 10.0 with either KOH or NaOH.

The two nozzles 2 and 5 in the drawing are shown in a configuration such that the two streams of droplets, i.e., sprays 1 and 4 of the second component and first component move concurrently. Other arrangements of the nozzles 2 and 5 may be used including one wherein the nozzles are placed horizontally on a diameter of the tube 3 so that the streams of droplets are directly opposed to each other.

The drawing shows water being run down the inside of the pipe to prevent a build-up of solids. An alternative method would be to have a series of water sprays arranged around the inside periphery of the pipe.

EXAMPLE VI

Formic Acid Containing Sizing Of The Present Invention Made By Spray Method

The procedure of Example V is followed except that formic acid is substituted for sulfamic acid in preparing the first component.

EXAMPLE VII

Ammonium Sulfamate Containing Sizing Made By Spray Method

The procedure of Example V is followed with the exception that the first component is prepared in accordance with Example III, not Example I.

EXAMPLE VIII

Ammonium Formate Containing Sizing Of The Present Invention Made by Spray Method The procedure of Example V is followed with the exception that the first component is prepared in accordance with Example IV, not Example I.

EXAMPLE IX

To test the sizing agents produced with formic acid and ammonium fumarate by the process of this invention with those produced with sulfamic acid and ammonium sulfamate samples of the products of Examples I through VII are treated as follows. The sizing agents are mixed with papermaker's alum in bleached hardwood kraft to compare their performance. Handsheets are made using 5.76 grams of fiber diluted in water to a 1.0 percent by weight slurry. The fiber and water are blended in a Waring blender for about one minute and then the sizing agents in the amount of 10 pounds per ton of fiber are added and mixed for about 45 seconds.

The alum then is added in a ratio of 15 pounds per ton of fiber.

The slurries are then diluted further with water to a fiber solids content of about 0.1 percent based on the weight of the slurry. Sheets then are formed with a Williams Handsheet Former from slurries made with the sizing agents exhibited in the examples. The sheets are placed between two blotters and then dried in a hot press having a temperature of about 110° C. and exerting a pressure of about 50 pounds per square inch. The sheets are then conditioned for 24 hours at 50 percent relative humidity and 22° C. and tested by the TAPPI Hot Ink Float Test.

The ink float test which is used to compare the effectiveness of various sizing agents uses an acid ink of the following composition:

1,000 ml—distilled water
.5 g—Gallic acid
7.5 g—$FeSO_4$
1.0 g—Tartaric acid
1.0 g—Sodium benzoate
3.5 g—Aniline Blue
50.9 g—Formic Acid.

In the ink float test, squares of paper of a given size are placed on the surface of the liquid ink, and the time is recorded in seconds for 50 percent of the surface to be colored by the ink. In general, the larger the number of seconds recorded for a given run, the more effective is the sizing agent employed in that run.

The results obtained are shown in Table I. Each set of experiments is performed in one day with the same fiber and the same type of water. Control results will vary from day to day depending on the fiber used, the quality of the water, and possibly other factors.

As illustrated in Table 1, the time involved for 50% of the surface area of the sheets of paper sized with sizing compositions made with formic acid or ammonium formate to become colored by the ink was considerably greater than the time involved when the paper was sized with a composition containing sulfamic acid or ammonium sulfate. When the sizing composition was formed by the agitation method, the time involved when the paper was sized with a formic acid containing composition of this invention was from 180 to 240 percent of the time involved when the paper was sized with a composition containing sulfamic acid. Likewise, when the composition was made with ammonium formate, the time involved was from 134 to 192 percent of the time when the composition was made with ammonium sulfamate. When the spray method was used, and the paper was sized with a composition containing formic acid, the time involved for 50 percent of the paper's surface area to be covered by the ink was from 164 to 220 percent of the time involved when the paper was sized with a sulfamic acid containing composition. When a sizing composition was used that had been made with ammonium formate, the time was from 164 to 175 percent of the time involved when the composition had been made with ammonium sulfate.

TABLE I

| Sulfamic Acid Containing Sizing Composition Made by Agitation Method (Example 1) | Formic Acid Containing Sizing Composition Made By Agitation Method (Example 2) | Improvement of Sizing Composition of Example 2 Over That of Example 1 | Ammonium Sulfamate Containing Sizing Composition Made By Agitation Method (Example 3) | Ammonium Formate Containing Sizing Composition Made By Agitation Method (Example 4) | Improvement of Sizing Composition of Example 4 Over That Of Example 3 |
|---|---|---|---|---|---|
| 240 sec. | 500 sec. | 208% | 330 sec. | 480 sec. | 145% |
| 260 | 480 | 180 | 300 | 490 | 163 |

TABLE I-continued

| | | | | | |
|---|---|---|---|---|---|
| 240 | 490 | 204 | 320 | 480 | 150 |
| 230 | 480 | 208 | 260 | 500 | 192 |
| 260 | 540 | 240 | 330 | 440 | 134 |

| Sulfamic Acid Containing Sizing Composition Made By Spray Method (Example 5) | Formic Acid Containing Sizing Composition Made By Spray Method (Example 6) | Improvement of Sizing Composition of Example 6 Over That of Example 5 | Ammonium Sulfamate Containing Sizing Composition Made By Spray Method (Example 7) | Ammonium Formate Containing Sizing Composition Made By Spray Method (Example 8) | Improvement of Sizing Composition of Example 8 Over That Of Example 7 |
|---|---|---|---|---|---|
| 300 sec. | 650 sec. | 217% | 370 sec. | 630 sec. | 170% |
| 320 | 600 | 190 | 390 | 640 | 164 |
| 300 | 640 | 220 | 360 | 630 | 175 |
| 360 | 590 | 164 | 380 | 650 | 171 |
| 320 | 650 | 203 | 370 | 630 | 170 |

It is claimed:

1. A sizing composition which comprises sizing-effective amounts of a rosin that is modified with from about 5 to 50 percent, based on the weight of the rosin, of an organic acidic compound selected from the group consisting of an alpha, beta-unsaturated aliphatic acid containing from about 3 to 6 carbon atoms, an anhydride thereof, and their mixtures; ammonia in amounts sufficient to enhance the sizing characteristics of the composition; ammonium formate effective to, and in amounts sufficient to, enhance the sizing characteristics of the composition; and containing amounts of the modified rosin, ammonia and ammonium formate sufficient to provide the composition with a total acidity of at least about 1,000 parts per million.

2. The sizing composition of claim 1 wherein the rosin is modified with an organic acidic compound selected from the group consisting of maleic acid, maleic anhydride, acrylic acid, fumaric acid, and their mixtures.

3. The sizing composition of claim 2 prepared with from about 3 to 30 percent ammonia, from about 4 to 72 percent ammonium formate and from about 93 to 25 percent rosin and organic acidic compound, based on the total weight of the ammonia, the ammonium formate and the rosin and organic acidic compound on a dry basis, and using an ammonium formate to ammonia ratio greater than about 1 to 1.

4. The sizing composition of claim 3 wherein the rosin is modified with from about 9 to 30 percent of the organic acidic compound and is at least partially saponified; the ammonium formate is the reaction product of ammonia and formic acid, and the composition is an aqueous mixture.

5. The sizing composition of claim 2 wherein the ammonia is provided by reaction between the rosin, the organic acidic compound, and the ammonium formate and the rosin is at least partially saponified.

6. A sizing composition comprising
(a) the reaction product of urea and formic acid, wherein the acid has been reacted with the urea in an amount sufficient to produce a reaction product having a total acidity of at least about 1,000 parts per million, and sizing effective amounts of
(b) a rosin that is modified with from about 5 to 50 percent, based on the weight of the rosin, of an organic acidic compound selected from the group consisting of an alpha, beta-unsaturated aliphatic acid containing from about 3 to 6 carbon atoms, an anhydride thereof, and their mixtures.

7. A sizing composition comprising
(a) the reaction product of urea and formic acid wherein the acid has been reacted with the urea in an amount sufficient to produce a reaction product having a total acidity of at least about 1,000 parts per million, and
(b) a rosin that is modified with from about 5 to 50 percent, based on the weight of the rosin, of an organic acidic compound selected from the group consisting of an alpha, beta-unsaturated aliphatic acid containing from about 3 to 6 carbon atoms an anhydride thereof, and their mixtures, said composition containing from about 25 to 85 percent, based on the total weight of the urea, the acid, the rosin, and the organic acidic compound, of component (a), and from about 75 to 15 percent of component (b).

8. The sizing composition of claim 7 wherein the rosin is modified with an organic acidic compound selected from the group consisting of maleic acid, maleic anhydride, acrylic acid, fumaric acid, and their mixtures.

9. The sizing composition of claim 7 wherein said rosin is tall oil rosin and is at least partially saponified.

10. The sizing composition of claim 9 wherein said rosin is modified with from about 9 to 30 percent of said organic acidic compound.

11. The sizing composition of claim 10 wherein said sizing composition is an aqueous mixture.

12. A method of making a sizing agent comprising
(a) forming a first component by reacting urea and formic acid, said acid being reacted in an amount sufficient to produce a reaction product having a total acidity of at least about 1,000 parts per million, at a pH of at least 7, said acidity being measured as the amount of sodium hydroxide, expressed as the equivalent parts by weight of calcium carbonate, required to impart a pink color to a million parts of a phenolphthalein-containing, 50 weight percent aqueous mixture of the reaction product, and said pH being determined by a pH meter,
(b) forming a second component by modifying rosin with from about 5 to 50 percent, based on the weight of the rosin, of an organic acidic compound selected from the group consisting of an alpha, beta-unsaturated aliphatic acid containing from about 3 to 6 carbon atoms, an anhydride thereof, and their mixtures, at a temperature between about 212° and 550° F., and forming a soap of said rosin before, during, or after said modifying, and
(c) mixing said first component and said second component in an amount sufficient to provide from about 25 to 85 percent, based on the total dry weight, of said first component reaction product and from about 75 to 15 percent of said second component soap of the modified rosin.

13. The method of claim 12 wherein said rosin is modified with an organic acidic compound selected from the group consisting of maleic acid, maleic anhydride, acrylic acid, fumaric acid, and their mixtures.

14. The method of claim 13 wherein said total acidity is at least about 4,000 parts per million.

15. The method of claim 13 wherein said soap is formed from said rosin by mixing said rosin with an aqueous solution of sodium hydroxide or potassium hydroxide.

16. The method of claim 13 wherein said rosin is modified with from about 9 to 30 percent of said organic acidic compound.

17. The method of claim 13 wherein said rosin is melted before it is modified with said organic acidic compound.

18. The method of claim 17 wherein said second component is cooled to room temperature by dilution with water before it is mixed with said first component.

19. The method of claim 13 wherein said first component is formed by reacting said urea and formic acid in the presence of from about 40 to 60 percent water, based on the total weight of the urea, the acid and the water.

20. The method of claim 13 wherein said second component is formed by modifying said rosin with said organic acidic compound in the presence of from 0 to 10 percent water, based on the total weight of the rosin, the organic acidic compound and the water.

21. A process for preparing a sizing composition having improved sizing characteristics which process comprises combining
(a) a first component made by reacting urea and formic acid, said formic acid being reacted in an amount sufficient to produce a reaction product having a total acidity of at least about 1,000 parts per milion, but a pH of at least 7, said acidity being measured as the amount of sodium hydroxide, expressed as the equivalent parts by weight of calcium carbonate, required to impart a pink color to a million parts of a phenolphthalein-containing, 50 weight percent aqueous mixture of the reaction product, and said pH being determined by a pH meter and
(b) a second component comprising a saponified, partly saponified or unsaponified rosin which is modified with an organic acidic material selected from alpha, beta-unsaturated aliphatic carboxylic acids containing from about 3 to 10 carbon atoms, anhydrides thereof, and mixtures of said acids and anhydrides; said first component and said second component being combined while said second component is in finely divided form to thereby provide a sizing composition or precursor thereof, which sizing composition or precursor thereof comprises sizing-effective amounts of said modified rosin, and sizing-enhancing amounts of said ammonia and ammonium salt-providing material, the amount of said modified rosin ammonia and ammonium salt being sufficient to provide a sizing composition with a total acidity of at least about 1,000 parts per million.

22. The process of claim 21 wherein said second component is formed into fine particles as said second component is added to said first component while said first component is subjected to high shear agitation sufficient to form second component particles having an average diameter of from about 10 to 1000 microns.

23. The process of claim 21 wherein said first component is also finely divided into fine particles while said first and second components are combined, both first and second component particles having an average diameter of from about 10 to 200 microns.

24. The process of claim 21 wherein said first and second components are converted into fine droplets by forcing said components through spray nozzles and wherein the two streams of spray are mixed in a suitable container.

25. The process of claim 22 or 24 wherein the rosin is modified with an organic acidic material selected from the group consisting of maleic acid, maleic anhydride, fumaric acid, and their mixtures.

26. The process of claim 25 wherein said sizing composition is prepared having about 3 to 30 percent ammonia, from about 4 to 72 percent ammonium salt and from about 93 to 25 percent rosin plus organic acidic material, based on the total weight of the ammonia, the ammonium formate and the rosin plus organic acidic material on a dry basis, and using an ammonium formate to ammonia ratio greater than about 1 to 1.

27. The process of claim 26 wherein the rosin is modified with from about 5 to 30 percent by weight of the rosin of the organic acidic material and is at least partially saponified; the ammonium formate is produced in situ after combination of the first and second components as the reaction product of ammonia and formic acid, and the composition is an aqueous mixture.

28. The process of claim 27 wherein the ammonia is provided in situ by reaction between the rosin, the rosin-modifying organic acidic material, and the ammonium formate; and the rosin is at least partially saponified.

29. The process of claim 28 wherein said sizing composition is prepared having from about 4 to 75 percent ammonium salt and from about 96 to 25 percent rosin plus modifying organic acidic material based on the total weight of the ammonium salt and the rosin plus modifying organic acidic material on a dry basis.

30. The process of claim 29 wherein said rosin is modified with from about 5 to 30 percent by weight of the rosin of said organic acidic material; the ammonium formate is produced in situ after combination of the first and second components as the reaction product of ammonia and formic acid; and the composition is an aqueous mixture.

31. The process of claim 25 wherein the ammonium salt is provided in situ by reaction between the rosin, the organic acidic material, and the ammonia after combination of the first and second components.

32. The process of claim 31 wherein the sizing composition is prepared having from about 10 to 75 percent ammonia and from about 90 to 25 percent of rosin plus modifying organic acidic material based on the total weight of the ammonia and the rosin plus modifying organic acidic material on a dry basis.

33. The process of claim 32 wherein the rosin is modified with from about 5 to 30 percent by weight of the rosin of the organic acidic material and the composition is an aqueous mixture.

34. The process of claim 31 wherein the rosin is at least partially saponified.

35. The process of claim 34 wherein the sizing composition contains from about 4 to 60 percent ammonia and from about 96 to 40 percent rosin plus modifying organic acidic material, based on the total weight of the ammonia and the rosin plus modifying organic acidic material on a dry basis.

36. The process of claim 35 wherein the rosin is modified with from about 9 to 30 percent by weight of the rosin of the organic acidic material and the composition is an aqueous mixture.

37. The process of claim 25 wherein the rosin is tall oil rosin and is at least partially saponified.

38. The process of claim 37 wherein said rosin is modified with from about 5 to 50 percent by weight of the rosin of said organic acidic material.

39. The process of claim 25 wherein said first composition component comprises from about 25 to 85 weight percent and said second composition component comprises from about 75 to about 15 weight percent of their mixture on a dry weight basis.

* * * * *